March 29, 1966 C. M. GOLD 3,243,682
BATTERY CHARGING DEVICE
Filed Jan. 28, 1963 2 Sheets-Sheet 1

INVENTOR.
CHARLES M. GOLD
BY Irving Holtzman
ATTORNEY

United States Patent Office 3,243,682
Patented Mar. 29, 1966

3,243,682
BATTERY CHARGING DEVICE
Charles M. Gold, Franklin Square, N.Y., assignor to Yardney International Corp., a corporation of New York
Filed Jan. 28, 1963, Ser. No. 254,160
6 Claims. (Cl. 320—46)

This invention relates to pressure sensitive control means for electrical devices or systems. More particularly, it relates to pressure sensitive electrical control means for battery charging devices or systems and to battery charging devices or systems containing the same.

It is known in the prior art to take advantage of the gassing that accompanies the end of charge of batteries to cut off the charging current. In systems utilizing this feature, when the gas pressure inside the battery reaches a certain level, a switch is usually opened which breaks the charging circuit.

A major disadvantage of devices of this character is that they have no way of compensating for gas leakages that may occur in the system. As a consequence, although the end of charge has been reached, the gas pressure in the system may not attain a sufficiently high level (due to gas leakage) to open the switch to cut off the charging current. The battery may thus to its detriment be accidentally overcharged.

It has now been found that the disadvantages mentioned above may be obviated by providing the battery charging system with a pressure sensitive control means which requires a predetermined pressure level to activate the control means (e.g. close the charging circuit) and a different predetermined pressure level to deactivate the control means (e.g. open the charging circuit). This pressure sensitive control means, hereinafter referred to as a differential pressure sensitive control means, although described herein in connection with a battery charging system, obviously has utility in other electrical control systems which are pressure responsive.

It is accordingly an object of the present invention to provide a differential pressure sensitive electrical control means for an electrical device or system.

It is also an object of the present invention to provide a differential pressure sensitive electrical control means for a battery charging device or system.

It is a further object of the present invention to provide a battery charging system in which is incorporated a differential pressure sensitive electrical control means.

It is still a further object of the present invention to provide a battery charging system in which is incorporated a differential pressure sensitive electrical control means embodying a safety feature designed to respond to gas leakages in the system.

Other and more detailed objects of this invention will be apparent from the following description and drawings wherein.

Figure 2:
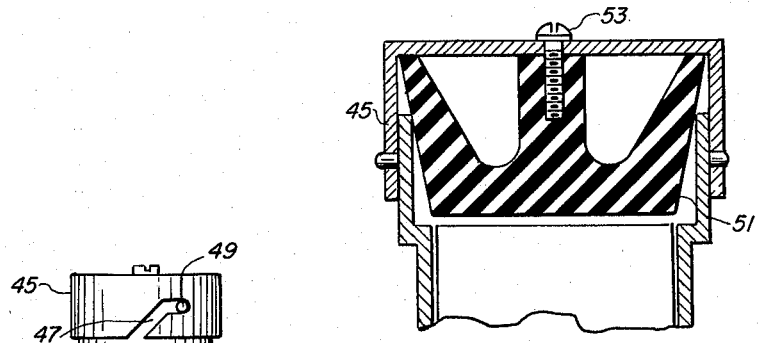
FIG. 2 is a cross-sectional view of the cover assembly shown at the top of FIG. 1 illustrating the details of the cover member and its relationship with the long cylindrical tubular member shown in FIG. 1.

Referring to the drawings, wherein the same numbers designate the same element in the various views, the charger assembly is shown generally at 1. Charger assembly 1 consists of a hollow base 3, open at the bottom of rectangular parallelepiped configuration on which is mounted a transformer 5. Extending through an opening in the roof of base 3 is a cylindrical housing 7 open at both ends. The lower end of housing 7 is closed off by a plate 9, preferably made of a synthetic plastic material such as Lucite. Plate 9 is secured to the under surface of the roof of base 3 in any suitable manner.

Mounted on the floor of cylindrical housing 7, are a pair of flexible electrical contacts 11 and 11' which make contact with the battery terminals of the battery inserted into housing 7 for charging. Contacts 11 and 11' are connected electrically to terminal studs 13 and 13' which are in turn connected to the charging circuit. Terminal studs 13 and 13' are preferably housed in holes which are bored through plate 9. The wires (not shown) connecting the terminal studs 13 and 13' to the charging circuit are contained in base 3.

Plate 9 is provided with a centrally disposed top hole 15 which extends from the top surface of plate 9 to a bottom cavity 17 of larger diameter. The latter ends at the lower surface of plate 9. Cavity 17 serves to house the pressure responsive mechanism.

Between top hole 15 and cavity 17, there is positioned a flexible membrane 19 made of any suitable material. This material should be flexible enough so as to be capable of being stretched under the pressure of the gases generated in the battery. Thin rubber membranes having a thickness of about 30 mils are suitable for this purpose.

Membrane 19 is maintained in position between hole 15 and cavity 17 by means of annular ring 21. The latter in turn is maintained in position by a lower removable plate 23 which is secured to the under side of plate 9.

Located within cavity 17 is piston member 25 which consists of a disc shaped horizontal portion 27 and a vertical plunger portion 29 integrally connected. The disc portion 27 rests on a spring 31 which biases the disc upwardly. The plunger portion 29 passes through an opening in lower plate 23 and engages arm 33 described in more detail below.

Gases generated in cylindrical housing 7 will pass through top hole 15 and exert a pressure against flexible membrane 19. This will cause flexible membrane 19 to bulge downwardly and to contact horizontal disc member 27 of piston member 25. This in turn, acting against spring 31 will move piston member 29 downwardly which movement will depress that portion of arm 33 that lies below it.

Arm 33 is a lever arm made of electrical insulating material and is mounted for rotation around pivot 35 which in turn is supported on support plate 37. Support plate 37 may be suspended from plate 9 or supported in any other suitable manner. The downward movement of piston member 25 will rotate arm 33 in a counter-clockwise direction.

The end of the lever arm 33, remote from the pivot 35 engages a switch spring 39 during its rotation and moves the same in the direction of switch 41. This movement of spring 39 pushes switch button 43 into the switch and closes the circuit so that charging can commence.

As shown in FIG. 2, cap 45 is provided in the interior thereof with a thin walled rubber cone 51. This is secured to the under side of the roof of cap 45 by means of screw 53.

Rubber cone 51 has several functions. It serves as a seal to seal the gases in cylindrical housing 7 that are generated in the batteries during charging. Furthermore, it serves as a safety factor to release the gas which builds up in housing 7 when the pressure therein gets too high. This is accomplished by the collapse of the thin walls of the cone which will occur at pressures in excess of between about 10 to 15 p.s.i. The cone 51 also serves to compress the air contained within the housing when cap 45 is twisted into place. The significance of this feature will be described in more detail below.

To close the upper opening of cylindrical housing 7, there is provided a removable bayonet cap 45. Bayonet cap 45 is equipped with a pair of angular slots 47 which engage bayonet lock pins 49. This arrangement is employed to provide a good and tight seal.

Figure 1:
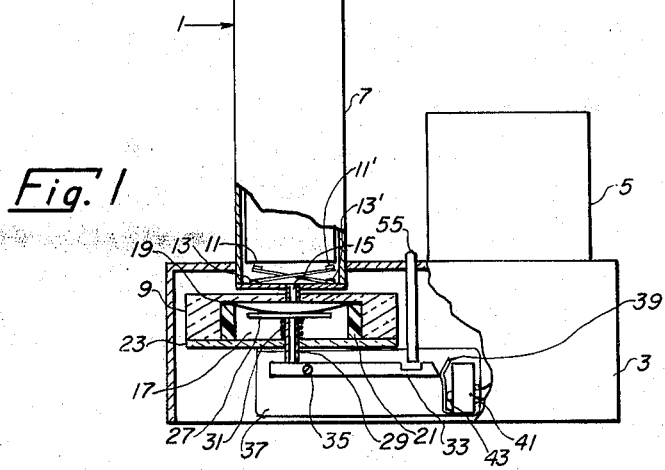
FIG. 1 is a partial side elevation of a battery charging device embodied in the present invention, the base being cut away to show the details of the differential pressure sensitive electrical control means.

As will be seen from FIG. 1, the arm 33 may assume 3 important positions with respect to switch spring 39. In the first position, the end of lever arm 33 lies below the bulge of spring 39 as a result of which button 43 is in its fully extended position and the switch is inactive.

In the second position, arm 33 fully engages switch spring 39 and button 43 is fully depressed. In this condition, the switch is activated and the charging circuit is complete.

In the third position, the arm 33 extends above the bulge of spring 39 and the pressure on button 43 is released. As a consequence, in this position, the switch is inactivated and the charging circuit is broken.

Reset button 55 is used to return arm 33 from the third position to the first position described above.

Although FIG. 1 illustrates a charger wherein the housing 7 is an integral part of the charger into which the batteries are inserted and maintained during charging and which is provided with a cap 45 for closing off the top of said housing, it is also contemplated by the present invention that the housing 7 and cap 45 be replaced by a battery which comprises a sealed container. The sealed container would house the battery cells and be provided with a gas outlet for the exit of gases that are developed by said cells. This sealed container would be adapted to be mounted on the charger so that the gas outlet thereof would communicate with the gas pressure sensing means in a manner similar to that shown in FIG. 1. The insertion of the sealed battery container into the charger system would create sufficient pressure against the flexible membrane of the pressure sensing device so as to activate the charging system. External terminals are provided on the sealed container which would engage the terminals of the charging system.

In operation, the battery to be charged is inserted into cylindrical housing 7 so that the terminals of the battery engage contacts 11 and 11'. Arm 33 is set in its lowest position by reset button 55. Cap 45 is then placed on housing 7 and turned into place. This action compresses the gases in cylindrical housing 7. As a consequence of this and of the movement of flexible membrane 19 and piston member 25, arm 33 is rotated from the lowest position to a second position. In the latter position, as described above, the charging circuit is closed and charging of the battery commences.

As the charging of the battery reaches completion, gassing thereof commences which increases the pressure within the housing 7. This change is transferred to arm 33 in the manner described above, and arm 33 is moved from the second position to a third position. In the third position, the charging circuit is broken in a manner also described above.

If a leak should develop in housing 7 during the charging operation, the gas pressure therein will fall below that necessary to keep arm 33 in the second position. As a consequence, it will fall back to the first position and the charging circuit will be broken. In this fashion, overcharging of a battery due to the presence of a gas leak is avoided.

Figure 3:
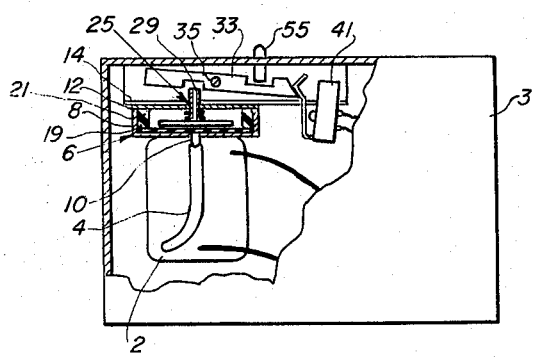
FIG. 3 is a bottom plan view of another embodiment of the present invention, similar to that shown in FIG. 1, illustrating a modification of the construction and location of the differential pressure sensitive electrical control means, the bottom plate of the device is cut away to show the details of the control means as viewed from below.

As mentioned above, another embodiment of this invention is shown in FIG. 3. This illustrates an arrangement wherein the pressure sensing element is a self-contained unit apart from a plate element, such as plate 9, which is the case in the embodiment shown in FIG. 1.

In this embodiment of the invention, cylindrical housing 7 is provided with a floor 2 which is integral with housing 7. A hole, not shown, is located at one corner 4 which connects said nipple to pressure sensing unit 6. of floor 2 from which extends a small nipple also not shown. Secured to said nipple is flexible tubing member Sensing unit 6 consists of a metal cup 8 provided with a hollow nipple 10 which communicates with the interior of the sensing unit 6 and on which tubing member 4 fits. A flexible membrane 19, identical with the one described in connection with FIG. 1 is laid against the floor of cup 8 and covers over the inner opening of nipple 10.

Pressure sensing unit 6 is also provided with an annular ring 21 and a piston member 25 identical in construction with the corresponding elements shown in the modification of FIG. 1. The pressure sensing assembly is maintained in cup 8 by means of a cover 12 which is provided with a central aperture through which the plunger 29 of piston 25 passes.

The pressure sensing unit 6 is thus not integral with housing 7 and is in fact located below and to the side of the floor of housing 7 and is only connected to the latter by means of tubing member 4. Unit 6 may be supported in any suitable manner such as support plate 14 which can be connected to the base 3.

The switching arrangement in this modification is substantially the same as that described in FIG. 1. Arm 33 is mounted for rotation around pivot 35 and activates and deactivates switch 41 as described above. After charging is complete, arm 33 may be reset by reset button 55.

Figure 4:
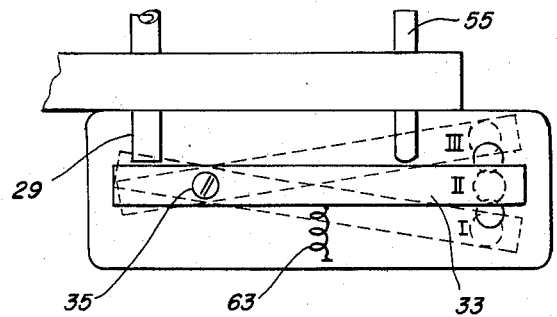
FIG. 4 is another modification of a differential pressure sensitive electrical control means shown in side elevation similar to that of FIG. 1 which can be employed in the device shown in said FIG. 1.
Figure 5:
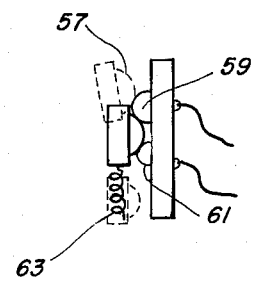
FIG. 5 is a partial elevational view of the differential pressure sensitive electrical control means shown in FIG. 4 as seen from the right side of FIG. 4, illustrating the relative positions of the stationary and movable electrical contact members during various phases of operation of the device.

Another modification of the pressure sensing and electrical switch assembly that may be employed in the charger of FIG. 1 is illustrated in FIGS. 4 and 5. In this embodiment, the arm 33 made of insulating material carries an electrical contact member 57, adapted to bridge two fixed contact members of unequal height 59 and 61 when the arm 33 is in the position shown in full line in FIG. 4. The arm 33 is fulcrumed at 35. At the end opposite the contact 57, it cooperates with plunger 29, the action of which is opposed by spring 63. Fifty-five is a reset button similar to that shown in FIG. 1.

The operation of this modification is as follows: Arm 33 normally bears on contact 61 only when the charging circuit is open. On inserting the battery to be charged into housing 7 and closing said housing by means of cap 45, the plunger 29, under the effect of compression developed within the housing 7 moves downwardly and causes the arm 33 to occupy the position II shown in FIGS. 4 and 5, thereby bridging the contacts 59 and 61, and closing the charging circuit. Arm 37 remains in this position throughout the charging.

When the charge is completed, the plunger 29 resumes its movement in the downward direction causing the contact-carrying end of arm 33 to move toward contact 59 thereby interrupting the electrical contact between 59 and 61. In moving toward contact 59, the contact 57 passes over contact 59 until it comes into the position III, shown in dotted lines on FIGS. 4 and 5, and stays locked in that position until restored to its original position, bearing on contact 61, by reset button 55.

Figure 6:
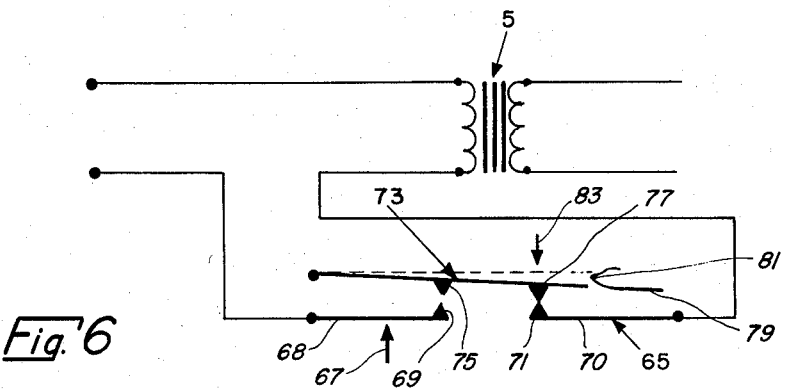
FIG. 6 is a schematic representation of still another modification of a differential pressure sensitive electrical control means which may be utilized in the device shown in FIG. 1, this view also being similar to that shown in FIG. 1.

Still another modification of the pressure sensing and electrical switch assembly that may be employed in the charger of FIG. 1 is illustrated diagrammatically in FIG. 6 of the drawings.

A pile of flat contact-carrying springs 65 is substituted for the lever and switch arrangement of FIG. 1 of the drawings. Arrow 67 is intended to represent plunger 29.

Spring 65 is composed of leafs 68 and 70 which carry contacts 69 and 71 respectively. Spring 65 also contains leaf 73 which carries contacts 75 and 77. Contact 69 is electrically connected to one pole of the power line. Contact 71 is electrically connected to one end of the primary winding of transformer 5, the other end of which goes to the other pole of the power line.

Spring 65 acts as a transfer spring. It brings contacts 69 and 71 into face to face relationship with contacts 75 and 77.

At its free end, spring 65 is in contact with bent spring 79 which is provided with a protuberance 81. Arrow 83 represents the reset button.

On inserting the battery to be charged into housing 7 and closing the cap 45, the plunger 29, i.e. arrow 67, moves upward in the view shown in this figure into a position wherein contacts 69 and 75 close without breaking the contact of contacts 71 and 77, thereby connecting the charger to the line. Upon completion of charge, the plunger resumes its motion in the upward direction, pushing upwardly leaf 73, causing the contacts 71 and 77 to open, thereby disconnecting the charger from the line. As leaf 73 is pushed upward, it passes the protuberance 81 and remains locked in a position shown in dotted line wherein contacts 71 and 77 are separated until the position shown in full line is restored by means of reset member 83.

Figure 7:
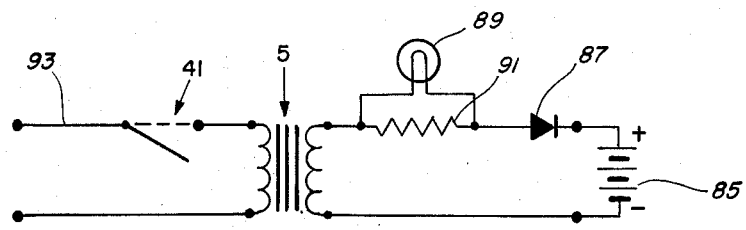
FIG. 7 is a circuit diagram embodied in this invention illustrating the electrical connections of the present charging system.

FIG. 7 is a diagram showing the electrical circuit of the charger assembly. The charging circuit includes the secondary winding of transformer 5 in series with battery 85, a rectifier 87 and a signal lamp 89 shunted by resistor 91. The primary winding of transformer 5 is connected across the power line 93 through a switch 41, shown in the open position.

On inserting the battery into the housing 7 shown in FIG. 1, and closing the housing by means of cap 45, the switch 41 closes as explained in this specification.

The switch opens automatically, disconnecting the charging device from the line, as explained, when the gas pressure within the housing, upon completion of charge, rises above a predetermined value.

The charging device according to the invention is adapted to charging individual electric cells or multicell battery units of all compatible sizes and configurations by appropriate electrical design and suitable dimensioning of housing 7. For example, if the battery consists of a plurality of individual cells housed in a common container, the charger as described herein is suitable for charging such a battery, provided the cells and the container housing them are not hermetically sealed, the battery container has two terminals at locations compatible with terminal contacts 11 and 11', and the charger housing 7 is designed to fit said battery.

Whereas the invention has been described with reference to specific forms thereof, it will be understood that many changes and modifications may be made without departing from the spirit of this invention.

What is claimed is:

1. A battery-charging system comprising a closeable housing adapted to receive therein a battery to be charged, said housing being provided with terminal means adapted to contact the terminals of said battery, charging-circuit means electrically connected to said terminal means, and switch means interposed in said charging-circuit means for opening and closing said charging-circuit means, pressure-sensitive electrical control means responsive to gas pressure developed in said housing upon charging of said battery, said control means activating said switch means by pressure developed in said housing on the closing thereof, whereby the charging of said battery is commenced, said control means deactivating said switch means on the attainment of a predetermined pressure inside said housing whereby the charging-circuit means is interrupted.

2. A battery-charging system comprising a gas-producing electrochemical battery and a closed receptacle adapted to receive said battery, an electrical charging circuit connectable with said battery, switch means in said circuit having a plurality of operating positions for energizing said circuit in one position and de-energizing it in others of said positions, and pressure-responsive control means communicating with said receptacle and controllingly connected with said switch means for normally maintaining said switch means in one of said other positions at a predetermined pressure in said receptacle, for selectively shifting said switch means to said one position and a second of said other positions upon application to said control means of different pressures in said receptacle elevated relative to said predetermined pressure, and for returning said switch means to said one of said other positions upon the reduction of said elevated pressures to said predetermined pressures.

3. A battery-charging system comprising a gas-producing electrochemical battery and a closed receptacle adapted to receive said battery, an electrical charging circuit connectable with said battery, switch means in said circuit having a plurality of operating positions for energizing said circuit in one position and de-energizing it in others of said positions, and pressure-responsive control meas communicating with said receptacle and controllingly connected with said switch means for normally maintaining said switch means in one of said other positions at a predetermined pressure in said receptacle, and for selectively shifting said switch means to said one position and a second of said other positions upon application of said control means of different pressures in said receptacle elevated relative to said predetermined pressure, said control means comprising pivotable lever means for selectively actuating said switch means, and diaphragm means adapted to act thereupon.

4. A system as defined in claim 3, further comprising a stepped cam interposed between said lever means and said switch means and displaceable by said lever means for actuating said switch means upon movement by said lever means.

5. A control system comprising an electrical circuit, pressure-generating means, switch means having a plurality of positions for energizing said circuit in one position and de-energizing it in others of said positions, and pressure-responsive control means operable by said pressure-generating means and controllingly connected with said switch means for shifting said switch means to said one energizing position at a predetermined pressure and for selectively shifting said switch means to one of said other de-energizing positions upon application to said control means of different pressures by said pressure generating means lower or higher than said predetermined pressure.

6. A control system comprising a gas-producing element, an electrical circuit connectable with said element for energizing same, switch means in said circuit having a plurality of operating positions for energizing said circuit in one position and de-energizing it in others of said positions, and pressure-responsive control means operable by said gas-producing element and controllingly connected with said switch means for shifting said switch means to said one energizing position at a predetermined pressure and for selectively shifting said switch means to one of said other de-energizing positions upon application to said control means of different pressures by said element lower or higher than said predetermined pressure.

References Cited by the Examiner

UNITED STATES PATENTS

| 2,909,627 | 10/1959 | Edwards | 200—81.4 X |
| 2,910,079 | 10/1959 | Beeghly | 137—467 X |
| 3,002,042 | 9/1961 | Rowe | 320—46 X |

LLOYD McCOLLUM, *Primary Examiner.*

G. H. GERSTMAN, S. M. WEINBERG,
*Assistant Examiners.*